United States Patent [19]

Kanno et al.

[11] Patent Number: 4,683,539
[45] Date of Patent: Jul. 28, 1987

[54] FUEL CONTROL SYSTEM FOR INTERNAL COMBUSTION ENGINE

[75] Inventors: Yoshiaki Kanno, Kakogawa; Yukinobu Nishimura, Himeji, both of Japan

[73] Assignee: Mitsubishi Denki Kabushiki Kaisha, Tokyo, Japan

[21] Appl. No.: 690,878

[22] Filed: Jan. 14, 1985

[30] Foreign Application Priority Data

Jan. 19, 1984 [JP] Japan .................................. 59-8329

[51] Int. Cl.⁴ .......................... F02D 5/02; G01F 1/68
[52] U.S. Cl. ............................... 364/431.05; 364/510; 123/494; 73/204
[58] Field of Search ...................... 364/431.05, 431.07, 364/510; 73/204; 123/494

[56] References Cited

U.S. PATENT DOCUMENTS

| | | | |
|---|---|---|---|
| 4,264,961 | 4/1981 | Nishimura et al. | 364/510 |
| 4,319,327 | 3/1982 | Higashiyama et al. | 364/431.05 |
| 4,404,846 | 9/1983 | Yamauchi et al. | 123/494 |
| 4,424,568 | 1/1984 | Nishimura et al. | 364/431.05 |
| 4,501,249 | 2/1985 | Amano et al. | 123/494 |
| 4,571,990 | 2/1986 | Honig | 73/204 |

FOREIGN PATENT DOCUMENTS 56-108909 8/1981 Japan .

Primary Examiner—Parshotam S. Lall
Attorney, Agent, or Firm—Leydig, Voit & Mayer

[57] ABSTRACT

A fuel control system for an internal combustion engine capable of correcting an inlet air flow rate, used for the computation of a fuel injection, in consideration of a blow-back flow rate. The inlet air flow rate is detected by a hot-wire type sensor and sampled by a control unit. The control unit determines whether or not the sampled inlet air flow rate has reversed twice its gradient from the negative one to the positive one between predetermined crank angles of the engine and computes the blow-back flow rate subtracted from the inlet air flow rate.

9 Claims, 26 Drawing Figures

FIG. 8B (VQo)

FIG. 8D  FLAG (FG)

FIG. 8E  FLAG (FN)

FIG. 8F (SMQ)

FIG. 8G (SPQ)

FIG. 9B (VQo)

FIG. 9D  FLAG (FG)

FIG. 9E  FLAG (FN)

FIG. 9F (SMQ)

FIG. 9G (SPQ)

FUEL CONTROL SYSTEM FOR INTERNAL COMBUSTION ENGINE

BACKGROUND OF THE INVENTION

This invention relates to a fuel control system for an internal combustion engine, and in particular to a fuel control system for an internal combustion engine wherein a true inlet air flow rate is detected for the engine control by taking account of a blow-back air flow rate.

Numerous systems for detecting the inlet air flow rate of an internal combustion engine for an automobile have been proposed. These have included a vane system for detecting the inlet air flow rate by detecting the dynamic air pressure based on the inclination of a movable vane, a system using von Karman's vortex street for detecting the inlet air flow rate based on the frequency of the vortex, and a hot-wire system for detecting the inlet air flow rate by utilizing the variation of the resistance of the hot-wire.

However, those inlet air flow rate detection systems have encountered pulsation and blow-back of the inlet air near the full air inlet condition where the throttle valve is fully opened at low engine speeds. This blow-back is caused be counter air flow from a cylinder of the engine to the inlet pipe when operation of the inlet valve and the exhaust valve of the engine overlap, as shown by the hatched portion in FIG. 1B which depicts air flow rate in relation to the motion of each of the pistons in the cylinders shown in FIG. 1A. Once the exhaust valve has closed and only the inlet valve is open, the air flow again is sucked into the engine. Due to this counter air flow, the true air flow rate can not be detected. Therefore, inlet air flow rate detection systems such as discussed above are easily influenced, depending upon the timing of the valves or the contour of the inlet pipe, when the engine speed is below 2000 rpm and the pressure in the inlet pipe is above −50 mmHg with respect to the atmosphere. Since a hot-wire system generates a signal independent of the direction of the air flow, it is particularly hard to distinguish blow-back air flow rate from air flow rate at the time of suction in these systems.

Other conventional fuel control systems for internal combustion engines utilizing a preset blow-back period according to the crank angle of the engine, or a thermal sensor system for detecting the direction of the air flow, as disclosed in Japanese Patent Application Laid-open No. 56-108909, and corresponding U.S. Pat. No. 4,404,846, have been proposed. However, both of these fuel control systems are complicated and expensive.

SUMMARY OF THE INVENTION

It is, accordingly, an object of the invention to provide a fuel control system for an internal combustion engine having a simple and inexpensive arrangement.

It is a specific object of the invention to provide a fuel control system for an internal combustion engine capable of determining the true air flow rate, SQ, from air flow rates at the time of suction SPQ, and a blow-back air flow rate during the blow-back period, SMQ, as determined from the output signal of a hot-wire type air flow rate sensor to correct for the blow-back flow rate when the throttle valve is fully opened a low engine speeds utilizing the equation $SQ=SPQ-SMQ$.

The essential features of a fuel control system for an internal combustion engine embodying the present invention comprise: a hot-wire type air flow rate sensor for detecting inlet air flow rate for the engine and providing as output a voltage corresponding to the inlet air flow rate; a sampling means for sampling the output of the flow rate sensor during a predetermined time interval or a predetermined crank angle; a converting means for converting the output Vi of the sampling means into an air flow rate Qi; a computing means for computing an average inlet air flow rate Qo according to the relationship $Qo=SQ/DN$ where value SQ is the sum of N number of the air flow rate determinations Qi; a control means for controlling the fuel supply amount for the engine on the basis of the inlet air flow rate Qi and the rotational speed of the engine; and, a means for determining the gradient of the output of the sensor from the output Vi of the sampling means or the air flow rate Qi; the computing means including correction means for computing the inlet air flow rate Qo according to the relationship $(SMQ-SPQ)/DN$ determined from the summation SMQ of N air flow rate samples Qi at the time of suction of the engine and the summation value SPQ of N air flow rate samples Qi at the time of blow-back occurrence on the basis of the result of the determination means and correcting the fuel supply amount.

BRIEF DESCRIPTION OF THE DRAWINGS

FIGS. 8A-8G show waveform diagrams illustrating the operations of FIGS. 6 and 7 in the presence of a blow-back phenomenon;

FIGS. 9A-9G show waveform diagrams illustrating the operations of FIGS. 6 and 7 in the absence of a blow-back phenomenon;

Throughout the figures, the same reference numerals indicate identical or corresponding portions.

DETAILED DESCRIPTION OF THE PREFERRED EMBODIMENTS

The present invention will now be described in detail with reference to the accompanying drawings illustrating the preferred embodiments of this invention.

Figure 1A:
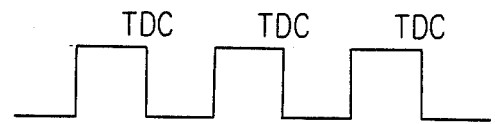
FIGS. 1A and 1B show waveform diagrams of the motion of each piston of an engine and inlet air flow for the engine in relation to the piston motion.
Figure 1B:
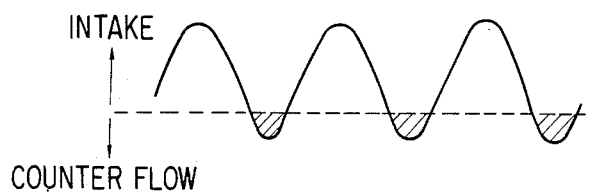
Figure 2A:
FIGS. 2A and 2B show waveform diagrams of the motion of each piston of an engine and of the output signal of a hot-wire type inlet air flow rate sensor in relation to the piston motion.
Figure 2B:
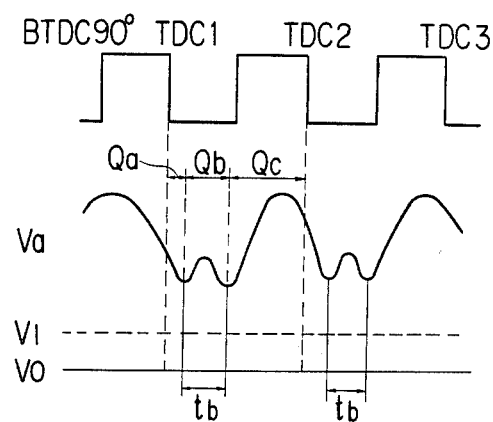
Figure 5:
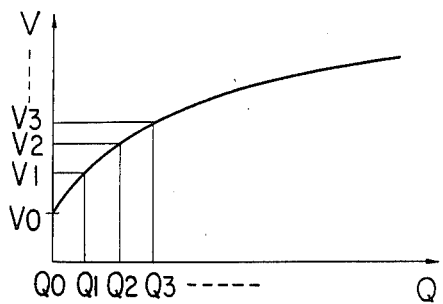
FIG. 5 shows an output characteristic diagram of the hot-wire type inlet air flow rate sensor.
Figure 3:
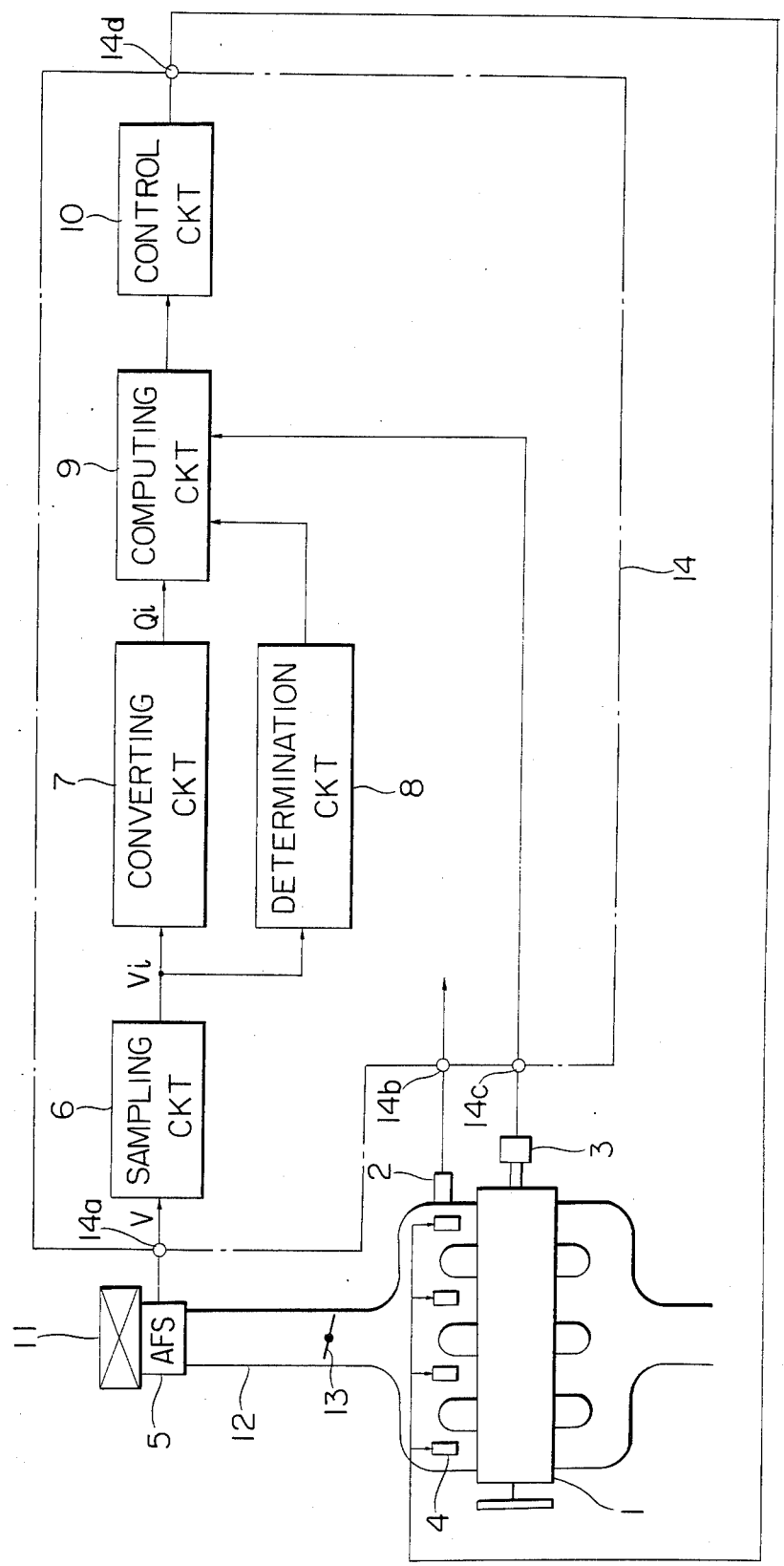
FIG. 3 shows a functional block diagram of one embodiment of a fuel control system for an internal combustion engine according to this invention.
Figure 4:
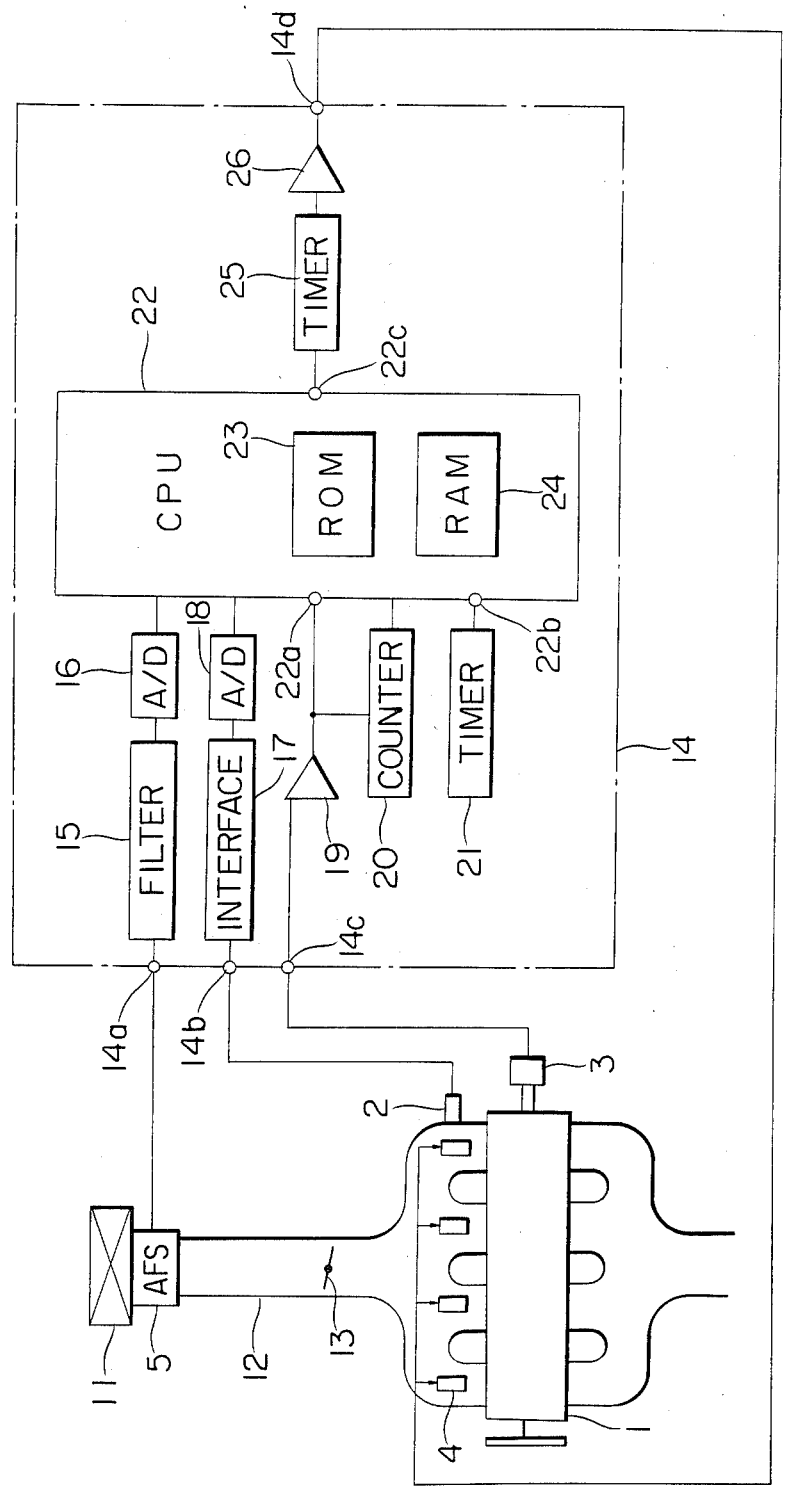
FIG. 4 shows a hardware block diagram of FIG. 3.

In FIG. 3 showing one embodiment of a fuel control system for an internal combustion engine according to this invention, and in FIG. 4 showing a specific hardware arrangement of the embodiment of FIG. 3, there is shown an internal combustion engine 1 having mounted thereon a coolant temperature sensor 2 and a crank angle sensor 3. The sensor 2 provides as an output a coolant temperature detection signal representative of the temperature of the cooling water (coolant) for the engine 1. As an example, it may be a thermistor which varies its resistance dependent on the coolant temperature. The sensor 3 detects the top dead center (TDC) of each of the pistons of the engine 1 and provides as an output a crank angle detection signal shown in FIG. 2A. Each of the cylinders of the engine 1 includes injectors 4 which are operated by a drive control signal, which will be hereinafter described, for controlling the amount of fuel supplied to the engine 1. A hot-wire type air flow rate sensor (hereinafter abbreviated as AFS) 5 detects an air flow rate Qi (Q1, Q2, Q3,-) sucked into the engine 1 and provides as an output therefrom a sensor output voltage V (V1, V2, V3,-) depending on the detected air flow rate as indicated in FIG. 5. The sensor output voltage V of the AFS 5 is sampled, for example, each 1 msec by a sampling circuit 6 which in turn provides as an output therefrom a sampled voltage Vi. The sampling circuit 6 is connected to a converting circuit 7 which converts the sampled voltage Vi output from the sampling circuit 6 into an inlet air flow rate Qi corresponding to the voltage Vi. The sampled voltage Vi is also received as an input by a determination circuit 8 in which an error is derived between adjacent voltage samples Vi to determine whether or not the error corresponds to a blow-back period and then to provide as an output a corresponding blow-back period indicative signal. It is to be noted that the determination circuit 8 may directly use the inlet air flow rate Qi instead of the sampled voltage Vi. The inlet air flow rate Qi from the converting circuit 7, the blow-back period indicative signal from the determination circuit 8, and the crank angle signal from the sensor 3 are together connected to a computing circuit 9 which determines the blow-back period and the suction period and calculates a true inlet air flow rate to provide as an output therefrom an inlet air flow rate signal. A control circuit 10 responds to the inlet air flow rate signal from the computing circuit 9 to send the above noted drive control signal corresponding to the inlet flow rate signal to the injector 4, thereby controlling the driving period of the injector 4 to adjust the amount of fuel supplied to the engine 1 from the injector 4. It is to be noted that the sampling timing may be provided by predetermined crank angles.

There are also shown in FIG. 3 an air cleaner 11, an inlet pipe 12, and a throttle valve 13 which are well known in the art.

The sampling circuit 6, the converting circuit 7, the determination circuit 8, the computing circuit 9, and the control circuit 10, together form a control unit 14. The input terminal 14a of control unit 14 receives the sensor output voltage V of the AFS 5. The input terminal 14b of AFS 5 receives a coolant temperature indicative signal from the coolant temperature sensor 2. Input input terminal 14c of temperature sensor 2 receives the crank angle indicative signal of the crank angle sensor 3. Output terminal 14d of crank angle sensor 3 provides the driving control signal.

In FIG. 4, the control unit 14 is shown in a hardware form, different from FIG. 3, including a filter 15 connected to the input terminal 14a, an analog-digital (A/D) converter 16 connected to the filter 15, an interface 17 connected to the input terminal 14b to convert the coolant temperature signal from the sensor 2 into a voltage signal, an A/D converter 18 connected to the interface 17, a waveform shaper 19 connected to the input terminal 14c, a counter 20 connected to the waveform shaper 19 to measure the time interval between adjacent TDC's at each time TDC is detected in the engine 1, and a timer 21 generating an interrupt signal, for example, each 1 msec. The A/D converters 16 and 18, the waveform shaper 19, the counter 20, and the timer 21 are connected to a micro-computer 22 which includes therein a ROM 23 and a RAM 24 and has interrupt terminals 22a and 22b respectively connected to the waveform shaper 19 and the timer 21. The micro-computer 22 calculates the driving time of the injector 4 corresponding to a fuel supply amount dependent on the operating condition of the engine 1 in accordance with a program previously stored in the ROM 23 on the basis of various input information, sets the driving time in the timer 25 connected to the output terminal 22c of the micro-computer 22, and provides a trigger signal to the timer 25 in response to the crank angle indicative signal. The timer 25 is connected to a driver circuit 26 whose output terminal is connected to the output terminal 14d of the control unit 14.

Figure 6:
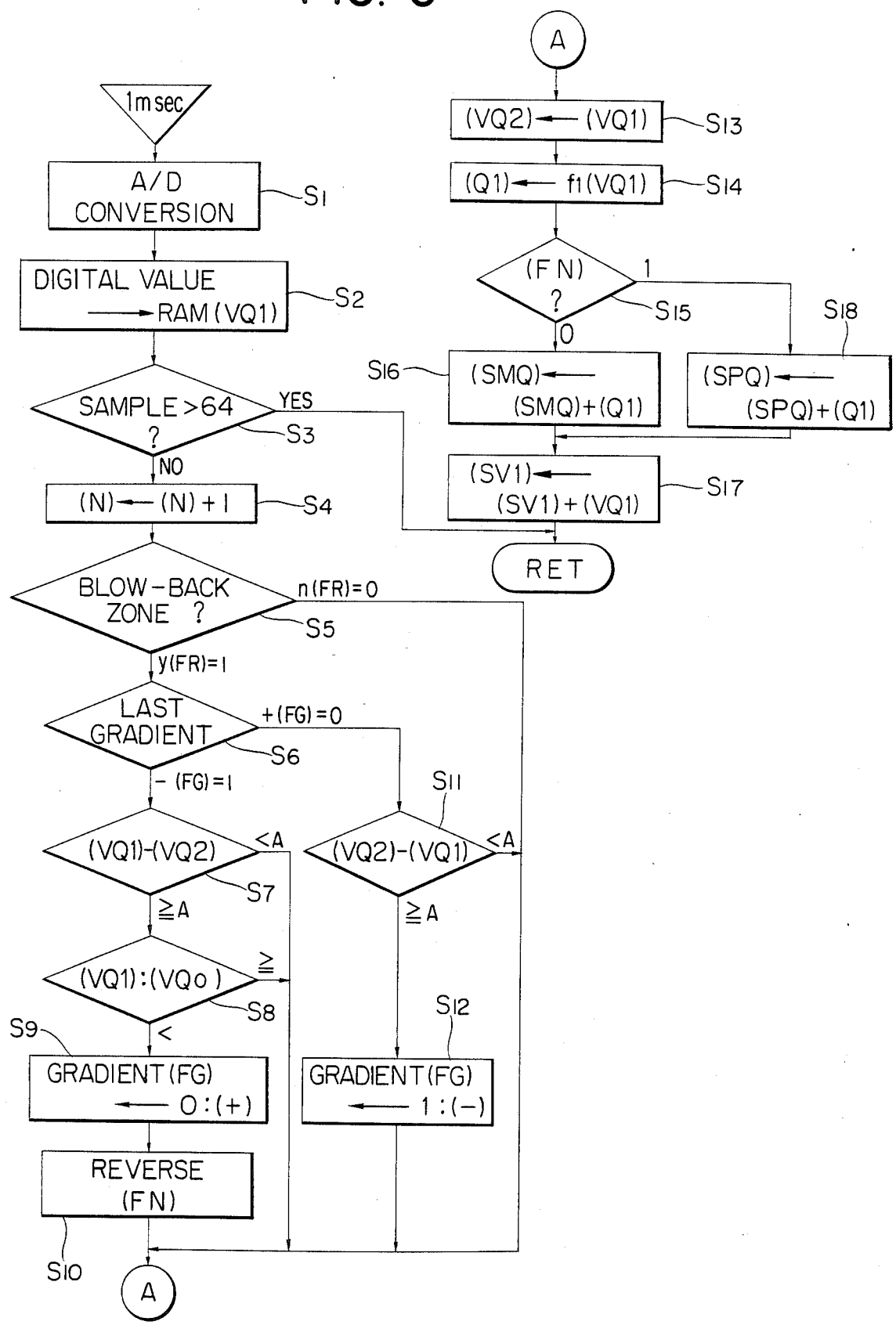
FIGS. 6 and 7 show flow charts for explaining the operation of the fuel control system in FIGS. 3 and 4.
Figure 7:
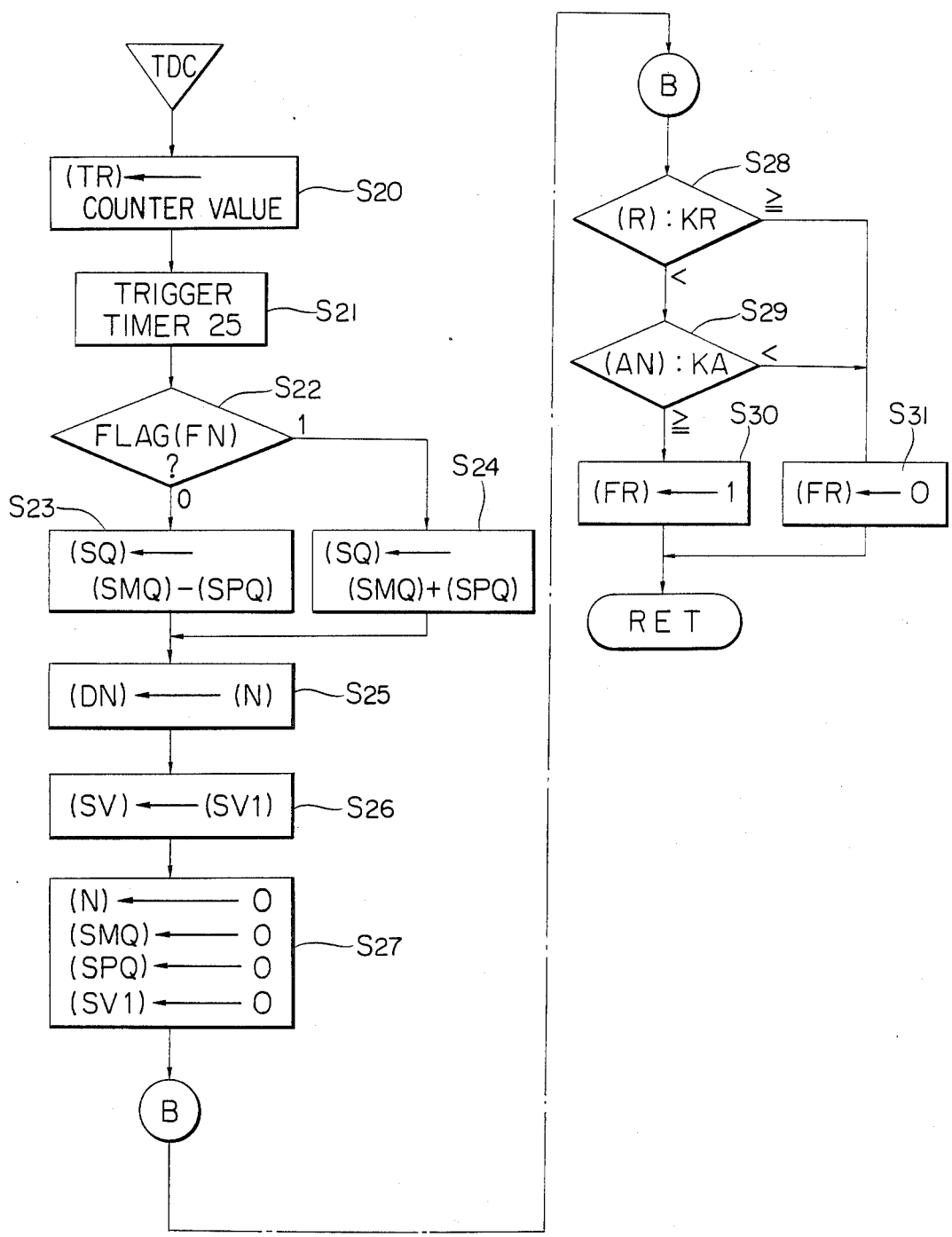

The operation of the fuel control system for an internal combustion engine thus arranged will now be described with reference to FIG. 6 showing a flow chart executed in the case where the interrupt terminal 22b of the micro-computer (hereinafter abbreviated as CPU) 22 receives as an input an interrupt signal each 1 msec, FIG. 7 showing a flow chart executed in the case where an interrupt signal is provided from the sensor 3 at the interrupt terminal 22a of the CPU 22, and FIGS. 8A–8G showing various waveforms when a blow-back air flow occurs as well as FIGS. 9A–9G showing various waveforms when no blow-back air flow occurs.

Figure 8A:
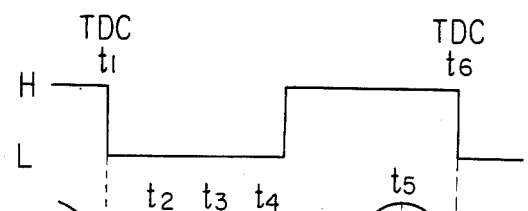
Figure 8A:
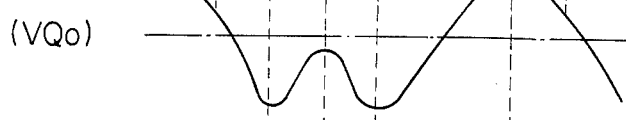
Figure 8C:
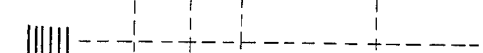
Figure 8C:
Figure 8C:
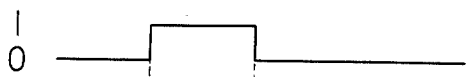
Figure 8C:
Figure 8C:

When an interrupt signal is input each 1 msec from the timer 21 to the interrupt terminal 22b of the CPU 22 as shown in FIG. 8C, the output voltage signal of the AFS 5 is converted into a digital value in Step S1 of FIG. 6 as shown in FIG. 8B. In Step S2, the converted digital value is stored as VQ1 in the RAM 24. In Step S3, it is determined whether or not the frequency (number of times) of the sampling of the output signal of the AFS 5 (FIG. 8B) exceeds a certain number, for example 64. If it exceeds 64, then the interrupt program will be exited without executing the steps described hereinbelow. If it does not exceed 64, then the sampling frequency N is increased by "one" in Step S4. Then in Step S5, it is checked whether or not the operating condition of the engine resides in a so-called blow-back zone. In the case where it is determined that the engine is in the blow-back zone, that a flag FR provided in the RAM 24 is 1, and the program proceeds to Step S6. Otherwise (flag FR=0) the process proceeds to of Step S13. The engine is in the blow-back zone when the engine speed is below a predetermined value (e.g. 1500 rpm) and the engine load (ratio of average air flow rate to engine rotation) is above a predetermined value (e.g. −200 mmHg boost pressure).

In Step S6, the gradient at the time of the previous sampling of the output signal of the AFS 5 (FIG. 8B) is determined to be positive or negative. If it is negative, then the Step S7 is executed while otherwise Step S11 is executed. In Step S7, it is determined whether or not a deviation (VQ1−VQ2) between the present sampled value (VQ1) of the output signal of the AFS 5 and the previous sampled value (VQ2), which was obtained 1 msec before, is larger than a predetermined value A. If at Step S7 it is determined that (VQ1−VQ2)≧A, implying that the gradient has reversed from a negative one to a positive one, the program proceeds to Step S8, where the present sampled value (VQ1) is compared with a predetermined value, for example, the mean value (VQo) of the sampled values of the output voltage of the AFS 5. If at Step S8 it is determined that VQ1<VQo, the program proceeds to Step S9 where a gradient flag (FG) provided in the RAM 24 is set to zero (positive gradient) as indicated in FIG. 8D. Next, in Step S10 a reverse flag (FN) provided in the RAM 24 is reversed at time point t2 as shown in FIG. 8E. If it is found in Step S7 that VQ1−VQ2<A or in Step S8 that VQ1≧VQ2, then the program proceeds to Step S13. If it is found in Step S6 that the last gradient is positive (flag FG=0), then it is checked in Step S11 whether or not VQ2−VQ1≧A. If it is the case, then in Step S12 the gradient flag (FG) will be set to 1 (negative). Otherwise, the program proceeds to Step S13.

In Step S13, the previous sampled value (VQ2) of the output of the AFS 5 stored in the RAM 24 is updated (replaced) by the present sampled value (VQ1) of the output of the AFS 5. Then in Step S14, the present sampled value (VQ1) of the output of the AFS 5 is converted into an inlet air flow rate in accordance witht the data of the characteristic curve shown in FIG. 5, which also stored in the RAM 24, and the converted data is stored as a flow rate Q1 in the RAM 24. Next, at Step S15, it is determined whether the reverse flag (FN) is 1 or 0, and if this flag is 0, indicating that there is no blow-back air flow, Step S16 where integrated data (SMQ) stored in a memory area provided in the RAM 24 is added with the flow rate (Q1) to obtain the integrated data (SMQ) shown in FIG. 8F. On the other hand, if in step S15 the flag (FN) is 1, indicating that there is a blow-back air flow, the program proceeds to Step S18 where integrated data (SPQ) stored in a memory area provided in the RAM 24 is added with the flow rate (Q1) to obtain the integrated data (SPQ) shown in FIG. 8G. Then in Step S17, the above sampled value (VQ1) is added to integrated voltage data (SV1) stored in a memory area provided in the RAM 24, whereby one interrupt processing per 1 msec has been completed.

When the output signal from the crank angle sensor 3 shown in FIG. 8A is input as an interrupt signal to the interrupt terminal 22a of the CPU 22, in Step S20 shown in FIG. 7, the count value of the counter 20 is read out by the CPU 22 and stored in the RAM 24, which is representative of a period (TR) between TDC outputs of the crank angle sensor 3 and indicative of the engine speed. Then in Step 21, the timer 25, for determining the driving time of the injector 4, is triggered to provide an output pulse corresponding to preset numerical values. The output pulse drives the injector 4 through the driver circuit 26. It is then checked in Step S22 whether the reverse flag (FN) obtained in Step S10 in FIG. 6 is 1 or 0. If it is 0, indicating that there is a blow-back air flow, the program proceeds to Step S23, where an inlet air flow rate $(SQ)=(SMQ)-(SPQ)$ is determined from the integrated data (SPQ) and (SMQ) obtained in Steps S16 and S18 in FIG. 6 and shown in FIGS. 8F and 8G. If it is 1, the program proceeds to Step S24 where an inlet air flow rate $(SQ)=(SMQ)+(SPQ)$ is determined as there is no blow-back air flow. Then in Step S25, the total sampling frequency N on the integrated data (SMQ) and (SPQ) is stored as (DN) in the RAM 24, and in Step S26 the integrated voltage data (SV1) of Step S17 in FIG. 6 is stored as (SV) in the RAM 24. Then in Step S27, the sampling frequency (N), the integrated data (SMQ) and (SPQ), and the integrated voltage data (SV1) are all cleared.

In Step S28, the engine speed (R) calculated from the TDC period (TR) is compared with a predetermined value KR. If in step S28 it is determined that R<KR, the program proceeds to Step S29 where an inlet air flow rate (AN) for each engine rotation is compared with a predetermined value KA. If it is found in Step S28 that the engine speed (R) is smaller than the predetermined value KR and if it is found in Step S29 that the inlet air flow rate (AN) is smaller than the predetermined value KA, the program proceeds to Step S30, where the blow-back zone flag (FR) is set to 1 while otherwise the proceeds to Step S31 where the blow-back zone flag (FR) is cleared to 0. It is to be noted that the inlet air flow rate (AN) per one engine rotation is a parameter corresponding to the engine load and proportional to the load. Namely in Steps S28–S31, the blow-back zone flag (FR) is set only when the engine speed is below a predetermined value and the engine load is above a predetermined value.

Thus, the program shown in FIG. 7 is executed at time point t1 (TDC) while the previous data is stored in the RAM 24 and each of the data values is initially set. During the time interval between the time points t1 and t2, since the gradient of the output of the AFS 5 is negative as shown in FIG. 8B, the output of the AFS 5 is instantaneously converted into an inlet air flow rate (Q1) at the time of the occurrence each 1 msec of the interrupt signal shown in FIG. 8C in Steps S1, S2, and S14 of FIG. 6 and sequentially integrated as the integrated data (SMQ). At the time point t2, it is determined in Steps S6–S10 that the gradient of the output of the AFS 5 has first reversed from the negative value to the positive value under the average voltage (VQo) shown in FIG. 8B whereby the reverse flag (FN) is made 1 as shown in FIG. 8E. Also the same determination is made at the time point t4 whereby the inlet air flow rate (Q1) is integrated as the integrated data (SPQ) until the reverse flag (FN) is reversed to 0, namely until the second reversion of the gradient. During the time interval between the time points t4 and t6 shown in FIG. 8B, the inlet air flow rate (Q1) is integrated with the integrated data (SMQ) in Step S16 in FIG. 6 to obtain the corresponding blow-back air flow rate. Therefore, when the blow-back phenomenon occurs, the reverse flag (FN) is changed from 0 to 1 at the time points t1 and t6 whereby in Step S23 of FIG. 7 the blow-back amount (SPQ) during the blow-back time interval is subtracted from the inlet air flow rate (SMQ) between TDC's except for the blow-back interval according to the calculation $(SQ)=(SMQ)-(SPQ)$.

Next, the description will be made with reference to the case where no blow-back phenomenon occurs along FIGS. 9A-9G.

Figure 9A:
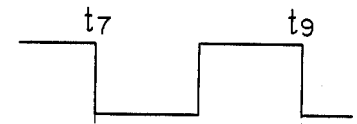
Figure 9A:
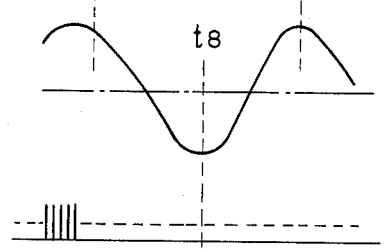
Figure 9C:
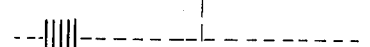
Figure 9C:
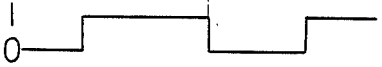
Figure 9C:
Figure 9C:
Figure 9C:

It is to be noted that at the time point t7 shown in FIG. 9A, the crank angle indicative signal from the sensor 3 is input to the interrupt terminal 22a of the CPU 22. During the time interval of t7-t8, the inlet air flow rate (Q1) is integrated with the integrated data (SMQ) shown in FIG. 9F, and during the time interval of t8-t9, the inlet air flow rate (Q1) is integrated with the integrated data (SPQ) shown in FIG. 9G. At the time point t9, because of the reverse flag (FN) being "1", an inlet air flow rate during the time interval of t7−t9 from the relationship $(SQ)=(SMQ)+(SPQ)$ can be determined according to Steps S22 and S24 in FIG. 7.

Figure 10:
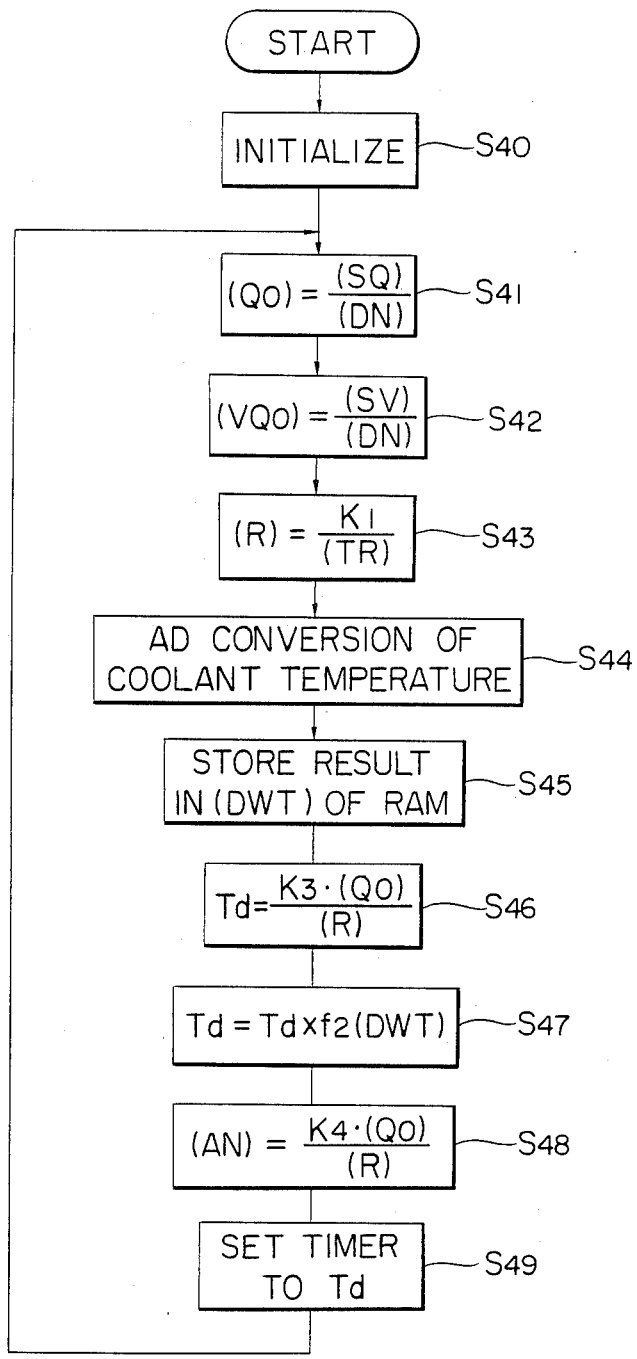
FIG. 10 shows a main flow chart for calculating the driving time of an injector used in FIG. 4.

FIG. 10 shows a flow chart for calculating the driving time of the injector 4. In Step S40, the internal data of the control unit 14 is initialized. Then in Step S41, an average inlet air flow rate (Qo) is obtained from the relationship $(Qo)=(SQ)/(DN)$ determined by the inlet air flow rate (SQ) (Step S23, S24 of FIG. 7) and the sampling frequency (DN) (Step S25 of FIG. 7), between predetermined crank angles detected by the crank angle sensor 3, stored in the RAM 24 according to the execution of the program of FIG. 7. Then in Step S42, the average voltage (VQo) used in Step S8 of FIG. 6 is obtained from the relationship $(VQo)=(SV)/(DN)$ determined by the integrated voltage data (SV) and the stored sampling frequency (DN). Then in Step S43, the rotational speed (R) of the engine 1 is obtained according to the relationship $(R)=K1/(TR)$ determined by the period (TR) and a predetermined constant K1. Then in Step S44, the A/D converter 18 converts the coolant temperature signal from the sensor 2 into a digital signal. Then in Step S45, the converted digital signal is stored a coolant temperature indicative data (DWT) in the RAM 24. In Step S46, the driving time Td is obtained according to the relationship $Td=K3\cdot(Qo)/(R)$ determined by a constant K3, the average inlet air flow rate (Qo), and the engine speed (R). Then in Step S47, correction is made according to the relationship $Td=Td\cdot f2(DWT)$ determined by a coefficient f2 previously stored in the RAM 23. Then in Step S48, the inlet air flow rate (AN) for one engine rotation is obtained from the relationship $(AN)=K4\cdot(Qo)/(R)$ determined by a constant K4, the average inlet air flow rate (Qo), and the engine speed (R), and in Step S49 the driving time Td is set in the timer 25. Then the program returns to Step S41 for the repetitive operation.

Figure 11:
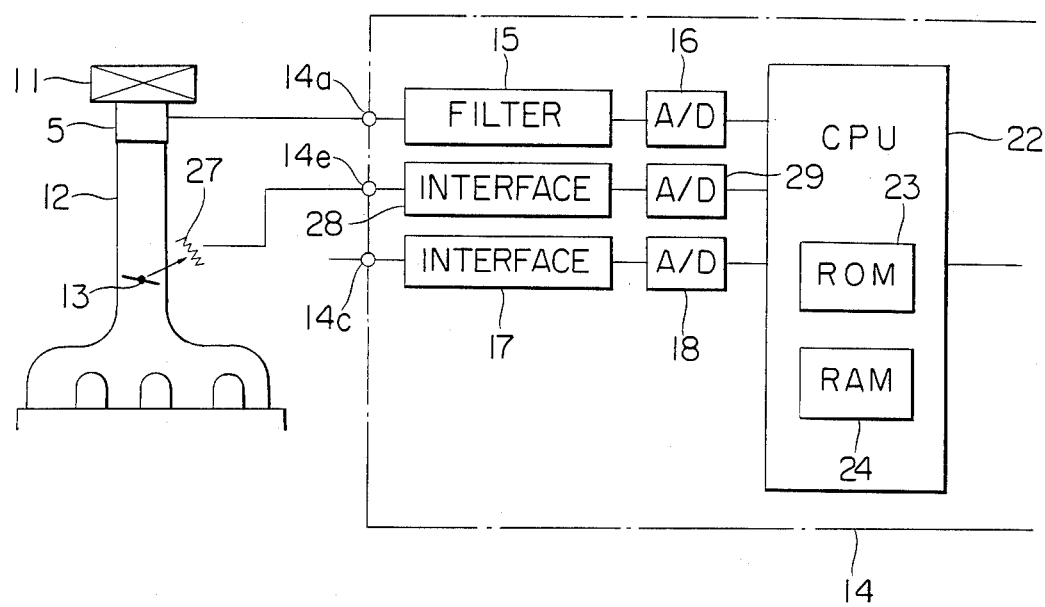
FIG. 11 shows a hardware block diagram of another embodiment of the fuel control system for an internal combustion engine according to this invention; and, FIG. 12 shows a flow chart for explaining the operation of FIG. 11.
Figure 12:
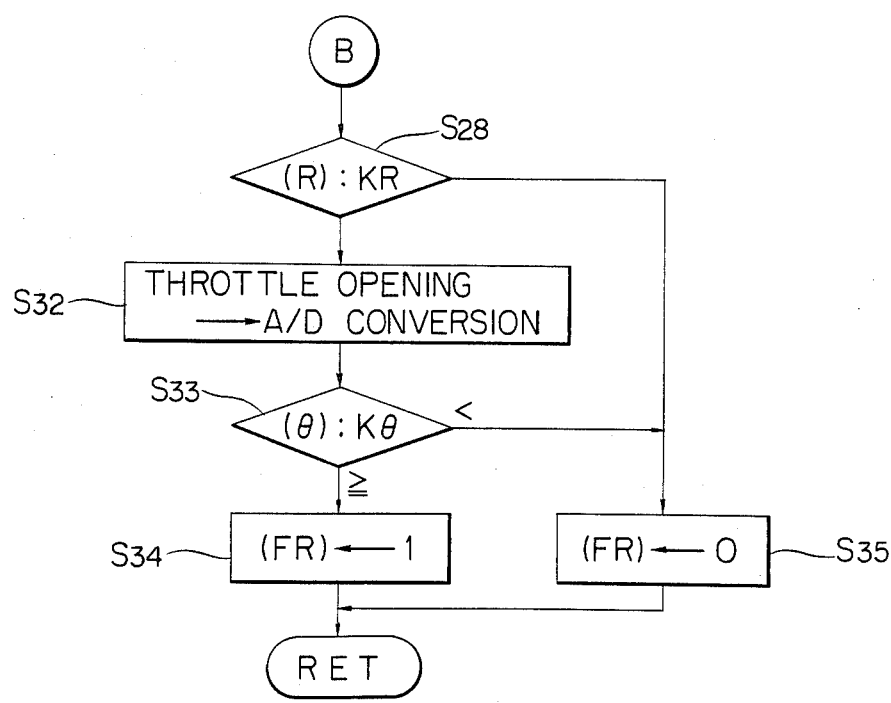

While it has been described that the blow-back zone is determined in Step S5 of FIG. 6 by the ratio (AN) of the engine speed (R) to the inlet air flow rate (VQo), this determination may be made by a throttle opening sensor 27 for detecting the opening of the throttle valve 13 and sending an opening indicative signal to the CPU 22 through an interface 28 and an A/D converter 29 as shown in FIG. 11. The corresponding program to be executed by flow of the CPU 22 is shown in FIG. 12 in which the same steps as Steps S20–S28 in FIG. 7 are executed. Then in Step S32, the opening of the throttle valve 13 is converted into a digital signal by an A/D converter 29 and; in Step S33, whether or not the throttle opening θ is larger than a predetermined value Kθ is checked. If it is the case, Step S34 is executed while otherwise Step S35 is executed.

Also while it has been described that the output voltage of the AFS 5 is processed on the basis of the crank angle indicative signal of the crank angle sensor 3, the output voltage of the AFS 5 may be processed on the basis of a signal in the primary of an ignition coil (not shown) at the time of ignition of the engine 1 by using a conventional distributor for controlling the ignition time of the engine 1. Furthermore, the determination Step S8 of FIG. 6 may be executed on the basis of the average inlet air flow rate (Qo), and a value used for this determination may be a constant.

As set forth above, the fuel control system for an internal combustion engine according to this invention can detect an inlet air flow rate exactly without provision of a particular apparatus for detecting blow-back phenomenon, resulting in a simple structure of low cost. The zone in which a blow-back processing is performed is defined by engine speed, ratio of inlet air flow rate and engine speed, etc., to determine the blow-back output waveform of the AFS, the blow-back air flow rate is accordingly determined.

It is to be noted that the present invention has been described with reference to the preferred embodiments described above and illustrated in the accompaning drawings but various modifications may be made without departing from the spirit of this invention.

What we claim is:

1. A fuel control system for an internal combustion engine comprising:
   a rotational speed sensor for determining the rotational speed of said engine and producing a signal representative thereof;
   a hot wire type air flow rate sensor for detecting an inlet air flow rate for the engine and producing an output signal corresponding to said inlet air flow rate;
   sampling means for receiving the output signal from said sensor at times corresponding to predetermined time intervals or predetermined crank angles and producing sample signals corresponding to said output signal;
   converting means for receiving said sample signals, determining values of air flow rate therefrom and producing signals representative of said values of air flow rate;
   determination means for determining the gradient of the output of said flow sensor from the sample signals of said sampling means or the output signals of said converting means and producing a signal characteristic thereof, said determination means including means for determining that the gradient of the output of said flow rate sensor has reversed twice from a negative gradient to a positive gradient between predetermined crank angles, the time interval between said two reversals being a time of blow back occurrence except said time interval between said predetermined cranks angles, that portion of said time interval being a time of suction of the engine, said determination means performing said determination only when the output signals of said sampling means are below a predetermined value;
   computing means for receiving the signals of said converting means and said determination means and computing an average inlet air flow rate therefrom, said computing means including correction means for computing the inlet air flow rate by addition of said values of air flow rate over the time of suction of the engine to obtain a first sum and addition of said values of air flow rate during the time of blow back occurrences to obtain a second sum, and substracting said second sum from said first sum to obtain the corrected inlet air flow rate and producing a signal representative thereof; and
   control means for controlling the fuel supply amount for the engine on the basis of said corrected inlet air flow rate and rotational speed signals.

2. A fuel control system for an internal combustion engine recited in claim 1 wherein said correction means performs said correction when the engine speed is below a predetermined value.

3. A fuel control system for an internal combustion engine recited in claim 1 wherein said correction means performs said correction when the ratio of said average inlet air flow rate and said engine speed is above a predetermined value.

4. A fuel control system for an internal combustion engine recited in claim 3 wherein said computing means includes a coolant temperature sensor for sensing the temperature of the coolant for the engine to provide the temperature signal used as a coefficient for the calculation of said ratio.

5. A fuel control system for an internal combustion engine recited in claim 1 wherein said correction means performs said correction when the opening of a throttle valve disposed in the course of the inlet pipe of the engine is above a predetermined degree.

6. A fuel control system for an internal combustion engine recited in claim 1 wherein said determination means performs said determination only when said inlet air flow rate is below a predetermined value.

7. A fuel control system for an internal combustion engine recited in claim 1 wherein said sampling means includes a timer generating one interrupt signal per a predetermined time interval to sample the output of said sensor.

8. A fuel control system for an internal combustion engine recited in claim 1 wherein said computing means includes a crank angle sensor for sensing a top dead center of the engine and a counter initiated by a signal from said crank angle sensor to measure the time interval of predetermined crank angles of the engine.

9. A fuel control system for an internal combustion engine recited in claim 1 wherein said computing means includes a read only memory having stored therein a program to calculate said fuel supply amount in response to the operating conditions of the engine.

* * * * *